United States Patent [19]

Ishizuka et al.

[11] 4,101,851
[45] Jul. 18, 1978

[54] VARIABLE EQUALIZER

[75] Inventors: Kohei Ishizuka; Yasuhiro Kita, both of Hachioji, Japan

[73] Assignee: Hitachi, Ltd., Japan

[21] Appl. No.: 745,057

[22] Filed: Nov. 26, 1976

[30] Foreign Application Priority Data

Dec. 1, 1975 [JP] Japan .............................. 50/142246

[51] Int. Cl.² ..................... H03H 5/00; H03G 11/04
[52] U.S. Cl. .................................. 333/28 R; 333/18; 333/80 T
[58] Field of Search ..................... 333/18, 28 R, 80 T

[56] References Cited

U.S. PATENT DOCUMENTS

| 3,582,832 | 6/1971 | Junge | 333/18 |
| 4,004,253 | 1/1977 | Takasaki et al. | 333/28 R |
| 4,039,981 | 8/1977 | Ohashi et al. | 333/80 T |

Primary Examiner—Alfred E. Smith
Assistant Examiner—Harry E. Barlow
Attorney, Agent, or Firm—Craig & Antonelli

[57] ABSTRACT

A variable equalizer wherein a series circuit which consists of a voltage source and an impedance circuit having an impedance $Z_x$ is connected in parallel with a circuit for changing an input voltage into a current, and an impedance circuit having an impedance $Z_y$ is also connected in parallel with this current source. The voltage value of the voltage source is made one which is obtained by multiplying the current by a value proportional to $1/Z_y$, and the impedance circuit having the impedance $Z_y$ is endowed with a frequency characteristic.

2 Claims, 5 Drawing Figures

VARIABLE EQUALIZER

BACKGROUND OF THE INVENTION

1. Field of the Invention

This invention relates to a variable equalizer for making variable a frequency characteristic which, when the frequency characteristic of a transmission line has changed, is introduced into the transmission line in order to compensate for the change.

2. Description of the Prior Art

Heretofore, the Bode type variable equalizer has been often employed in case of a change in the frequency characteristic of a transmission line. This variable equalizer varies the frequency characteristics by varying the resistance value of a single resistor. The equalizer requires a dual network, so that whenever a capacitor is employed in the circuit, a coil becomes necessary. It is therefore unsuitable for fabrication in the form of an integrated circuit and for miniaturization.

Further, the prior art effects the variation of the frequency characteristic on the basis of feedback. In this connection, it is difficult to eliminate the phase shift between an input and an output irrespective of the frequency over the entire frequency range, especially in a high frequency portion.

SUMMARY OF THE INVENTION

An object of this invention is to obviate the above-mentioned disadvantages and to provide a variable equalizer which includes no coil and which requires no feedback.

Another object of this invention is to provide a variable equalizer which has a good high-frequency characteristic.

Still another object of this invention is to provide a variable equalizer which can be put into the form of an integrated circuit and which can be miniaturized.

This invention for accomplishing such objects is characterized in that a series circuit consisting of an a.c. voltage source and a first impedance circuit, and a second impedance circuit are connected in parallel with an a.c. current source, that the a.c. current source is employed as an input signal source, and that a value which is obtained by multiplying an input signal by a value proportional to the inverse number of an impedance value of the second impedance circuit is made equal to a voltage value which is generated from the a.c. voltage source.

DESCRIPTION OF THE PREFERRED EMBODIMENTS

Figure 1:
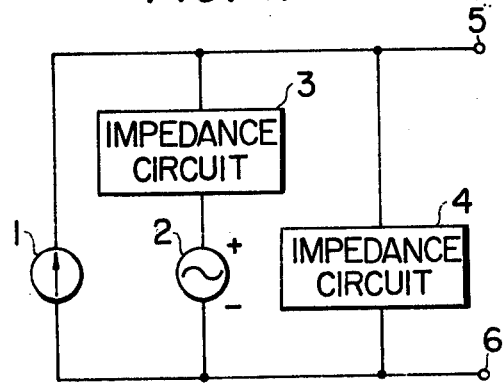
FIG. 1 is a block diagram showing the construction of the variable equalizer of this invention.

FIG. 1 is a block diagram which shows the construction of the variable equalizer according to this invention. Numeral 1 designates an a.c. current source, numeral 2 an a.c. voltage source, numeral 3 an impedance circuit connected in series with the a.c. voltage source 2, and numeral 4 another impedance circuit.

The series circuit consisting of the a.c. voltage source 2 and the impedance circuit 3 is connected in parallel with the a.c. current source 1, and the impedance circuit 4 is also connected in parallel with the a.c. current source 1.

In the circuit arrangement of the figure, an input signal is given in the form of, for example, an a.c. voltage. Letting the value of the input a.c. voltage be $v_i$, an a.c. current $1/k \, v_i$ is generated in the a.c. current source 1. Here, $k$ denotes a constant. The impedance circuit 3 has an impedance $Z_x$, while the impedance circuit 4 has an impedance $Z_y$. An a.c. voltage to be generated in the a.c. voltage source 2 is made equal to the product between the input a.c. voltage $v_i$ and a value $k/Z_y$. Accordingly, an a.c. output voltage $v_o$ which is provided across terminals 5 and 6 becomes:

$$\frac{v_o}{v_i} = \frac{1 + \frac{Z_x}{k} \cdot \frac{Z_y}{k}}{\frac{Z_x}{k} + \frac{Z_y}{k}} \tag{1}$$

Here, one of the impedance circuits having the impedances $Z_x$ and $Z_y$ is endowed with a frequency characteristic, and the other is made a circuit capable of varying only the impedance value without any frequency characteristic. Then, Eq. (1) exhibits a symmetric variation characteristic, and the requirement of the variable equalizer is fulfilled.

Figure 2:
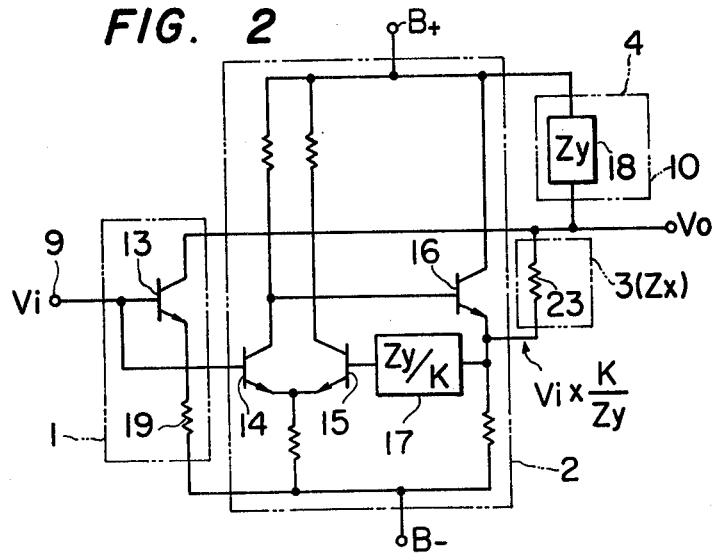
FIGS. 2 and 3 are circuit diagrams each showing a specific construction of the variable equalizer according to this invention.
Figure 3:
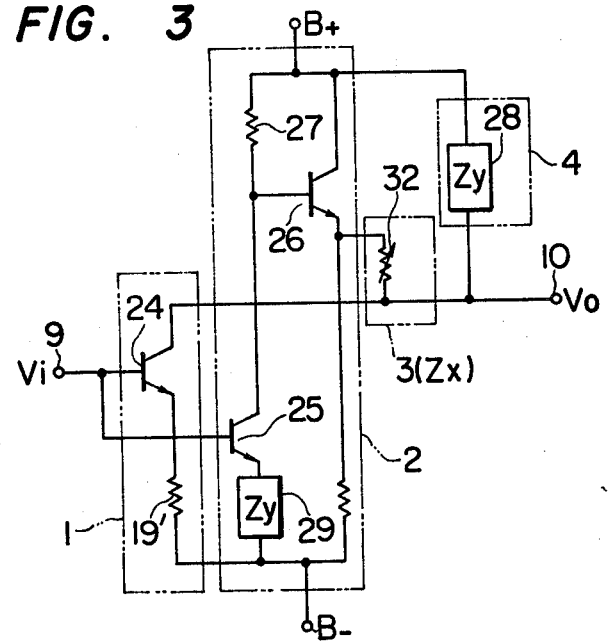

FIGS. 2 and 3 are diagrams each showing a specific construction of the variable equalizer illustrated in FIG. 1. Referring to FIG. 2, an input signal is applied to a terminal 9 in the form of a voltage. By taking it out from the collector of a transistor 13, it is converted into a current. When an emitter resistance 19 of the transistor 13 is set at a value K and the signal voltage applied to the terminal 9 has a magnitude $v_i$, the collector current I of the transistor 13 becomes:

$$I = V_i/K$$

The current conversion by the transistor 13 corresponds to the function of the current source 1 in FIG. 1.

In the circuit arrangement of FIG. 2, letting the transfer function of a circuit 17 be $Z_y/K$, a voltage which is generated at the emitter of a transistor 16 by the amplifying operation of transistors 14, 15 and 16 becomes $-K/Z_y$ times the input signal applied to the terminal 9, and the a.c. voltage source 2 in FIG. 1 is formed. The impedance circuit 4 in FIG. 1 corresponds to a circuit 18 in FIG. 2. Subsequently, a variable resistance 23 which corresponds to the impedance $Z_x$ of the impedance circuit 3 in FIG. 1 is connected to the emitter of the transistor 16 in FIG. 2, and impedance circuits 17 and 18 are endowed with a frequency characteristic. Then, an output voltage $V_o$ at a terminal 10 becomes:

$$\frac{V_o}{V_i} = -\frac{1 + \frac{Z_x}{K} \cdot \frac{Z_y}{K}}{\frac{Z_x}{K} + \frac{Z_y}{K}} \tag{2}$$

By varying the resistance 23 which corresponds to $Z_x$, the characteristic as the variable equalizer can be attained.

$B_+$ and $B_-$ indicate power supply terminals for the transistors, and a positive voltage is applied to the terminal $B_+$ and a negative voltage to the terminal $B_-$.

In the embodiment of FIG. 3, a transistor 24 is provided, and an emitter resistance 19' thereof is set at a value K. Thus, as in FIG. 2, an input voltage applied to the terminal 9 is converted into a current, and the current source 1 shown in FIG. 1 is realized. A current owing to a transistor 25 is converted into a voltage by a resistance 27 having a resistance value K, a transistor 26 and the impedance $Z_y$ of an impedance circuit 29. Thus, the a.c. voltage source 2 shown in FIG. 1 is formed. A variable resistance 32 which corresponds to the impedance $Z_x$ of the impedance circuit 3 in FIG. 1 is connected to the voltage source. Further, a circuit 28 which has the impedance $Z_y$ of the impedance circuit 4 in FIG. 1 is connected as a load of the current source composed of the transistor 24. The impedance circuits 28 and 29 are endowed with a frequency characteristic. Then, by varying the resistance 32, an output voltage $V_o$ at the terminal 10 can produce the characteristic as the variable equalizer as in FIG. 2.

In this case, when a variable resistance element such as FET is employed as the variable resistance 23 in FIG. 2 or the variable resistance 32 in FIG. 3, it is a also possible to electrically control the variable equalizer.

Figure 4A:
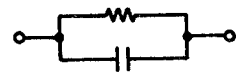
FIGS. 4A and 4B are circuit diagrams showing examples of impedance circuits in the embodiment shown in FIG. 2.
Figure 4B:
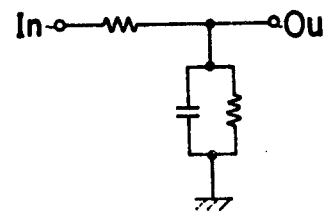

FIGS. 4A and 4B are circuit diagrams showing actual examples of the impedance circuits shown in FIG. 2. The circuit composed of a resistance and a capacitor as shown in FIG. 4A is the actual example of the impedance circuit 18 illustrated in FIG. 2. The circuit composed of resistances and a capacitor as shown in FIG. 4B is the actual example of the impedance circuit 17 illustrated in FIG. 2. Here, the frequency characteristic of the impedances $Z_y$ and $Z_y/K$ may be designed so as to demonstrate substantially the frequency characteristic of a transmission line to be equalized. Of course, an input terminal In and an output terminal Ou in FIG. 4B are respectively connected to the emitter electrode of the transistor 16 and the base electrode of the transistor 15.

The impedance circuits 28 and 29 shown in FIG. 3 may be similarly designed.

As set forth above, according to this invention, the variation characteristic can be readily obtained without employing any coil. In addition, since no feedback is conducted, the variable equalizer of good high-frequency characteristic can be realized. The invention is greatly effective in practical use in that the problems of the prior-art variable equalizer in the fabrication into the form of an IC, the miniaturization, and the achievement of a wide band have been solved.

We claim:

1. A variable equalizer, comprising:
    an a.c. current source which generates a current proportional to an input signal,
    a series circuit which consists of an a.c. voltage source and a first impedance circuit and which is connected in parallel with said a.c. current source, and
    a second impedance circuit which is connected in parallel with said a.c. current source,
    a voltage from said a.c. voltage source being made equal to a value obtained by multiplying a magnitude of said input signal by an inverse number of an impedance value of said second impedance circuit,
    at least one of said impedance circuits being endowed with a frequency characteristic.

2. A variable equalizer, comprising:
    conversion means for converting an input voltage into a current,
    a series circuit which consists of a first impedance circuit and an a.c. voltage source and which is connected in parallel with said conversion means, and
    a second impedance circuit which is connected in parallel with said conversion means,
    either of said first and second impedance circuits having a frequency characteristic,
    a voltage of said voltage source being made a value which is obtained by multiplying said input voltage by a value proportional to an inverse number of an impedance value of said second impedance circuit.

* * * * *